US012572514B2

(12) United States Patent
Glasser

(10) Patent No.: US 12,572,514 B2
(45) Date of Patent: *Mar. 10, 2026

(54) SYSTEM AND METHOD FOR INFORMATION STORAGE USING BLOCKCHAIN DATABASES COMBINED WITH POINTER DATABASES

(71) Applicant: Avery Glasser, Munich Bavaria (DE)

(72) Inventor: Avery Glasser, Munich Bavaria (DE)

( * ) Notice: Subject to any disclaimer, the term of this patent is extended or adjusted under 35 U.S.C. 154(b) by 98 days.

This patent is subject to a terminal disclaimer.

(21) Appl. No.: 18/073,541

(22) Filed: Dec. 1, 2022

(65) Prior Publication Data

US 2023/0169045 A1 Jun. 1, 2023

Related U.S. Application Data

(63) Continuation-in-part of application No. 17/700,417, filed on Mar. 21, 2022, now Pat. No. 11,520,751, which is a continuation of application No. 17/335,338, filed on Jun. 1, 2021, now Pat. No. 11,281,633, which is a continuation of application No. 16/598,006, filed on Oct. 10, 2019, now Pat. No. 11,023,423.

(51) Int. Cl.
*G06F 16/182* (2019.01)
*G06F 16/13* (2019.01)
*G06F 21/32* (2013.01)
*H04L 9/06* (2006.01)

(52) U.S. Cl.
CPC ........ *G06F 16/1837* (2019.01); *G06F 16/134* (2019.01); *G06F 21/32* (2013.01); *H04L 9/0637* (2013.01)

(58) Field of Classification Search
None
See application file for complete search history.

(56) References Cited

U.S. PATENT DOCUMENTS

| | | | |
|---|---|---|---|
| 10,116,657 B2 | 10/2018 | Andrade | |
| 10,637,662 B2 | 4/2020 | Baughman et al. | |
| 10,796,393 B2 | 10/2020 | Messerges et al. | |
| 11,269,842 B2 | 3/2022 | Sun et al. | |
| 2016/0308855 A1 | 10/2016 | Lacey et al. | |
| 2018/0167200 A1* | 6/2018 | High .................. | G06F 21/6245 |
| 2019/0068367 A1 | 2/2019 | Baughman et al. | |
| 2020/0050595 A1 | 2/2020 | Sun et al. | |

\* cited by examiner

*Primary Examiner* — Umar Mian
(74) *Attorney, Agent, or Firm* — Galvin Patent Law LLC; Brian R. Galvin

(57) ABSTRACT

A system and method for information storage using blockchain and pointer databases, comprising a computer with a blockchain manager and datastore manager, and blockchain data input, which connects over a network to a distributed blockchain ledger containing information such as personally-identifying data and a datastore system containing searchable information such as a DNS system on the persons entered into the blockchain, the datastore system also containing reference numbers for each searchable block in the blockchain, such that verification or identification can both be accomplished swiftly and securely of data in the blockchain such as for data verification to verify or identify persons submitting data to such a system.

16 Claims, 13 Drawing Sheets

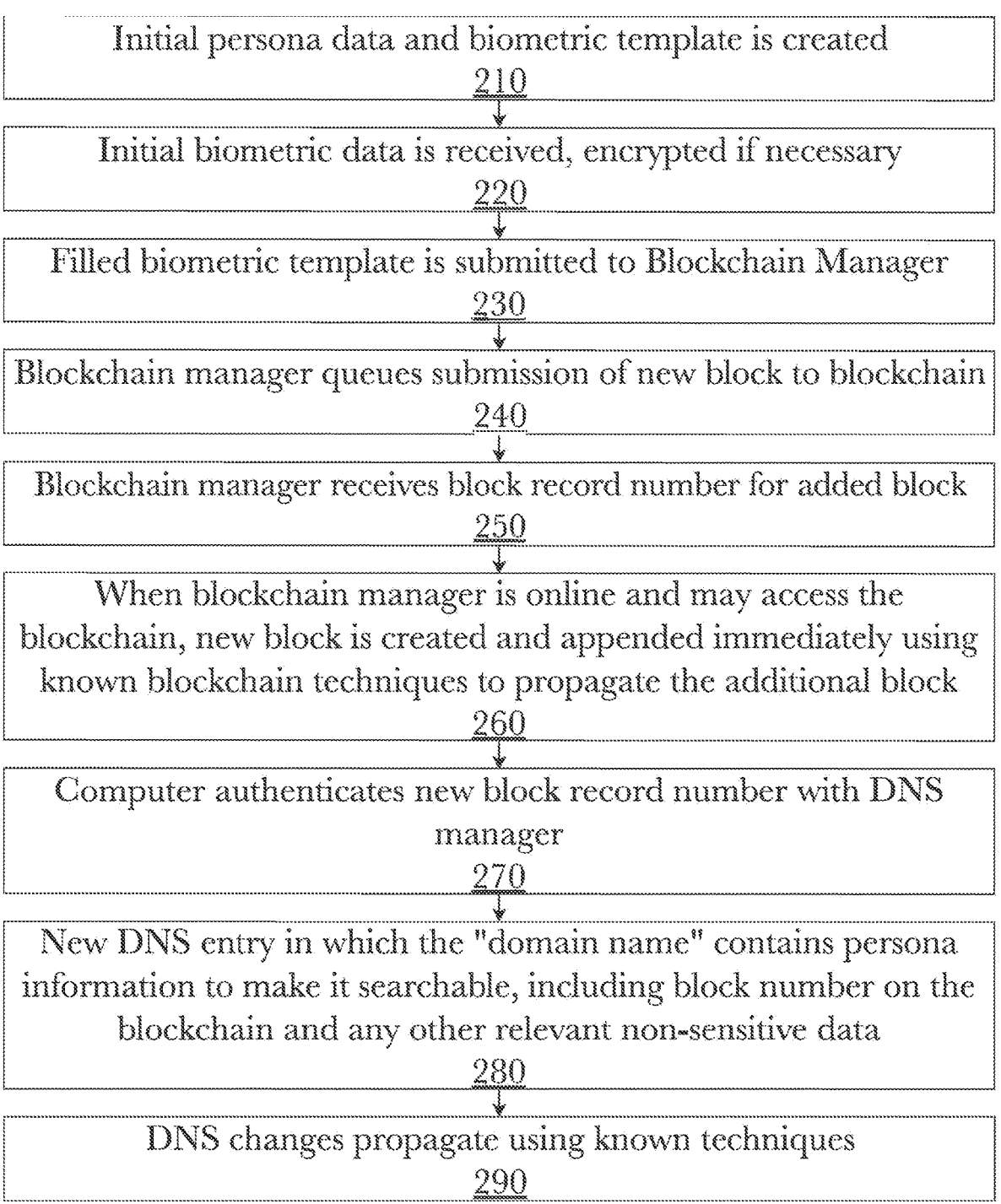

Initial persona data and biometric template is created
210

Initial biometric data is received, encrypted if necessary
220

Filled biometric template is submitted to Blockchain Manager
230

Blockchain manager queues submission of new block to blockchain
240

Blockchain manager receives block record number for added block
250

When blockchain manager is online and may access the blockchain, new block is created and appended immediately using known blockchain techniques to propagate the additional block
260

Computer authenticates new block record number with DNS manager
270

New DNS entry in which the "domain name" contains persona information to make it searchable, including block number on the blockchain and any other relevant non-sensitive data
280

DNS changes propagate using known techniques
290

Fig. 2

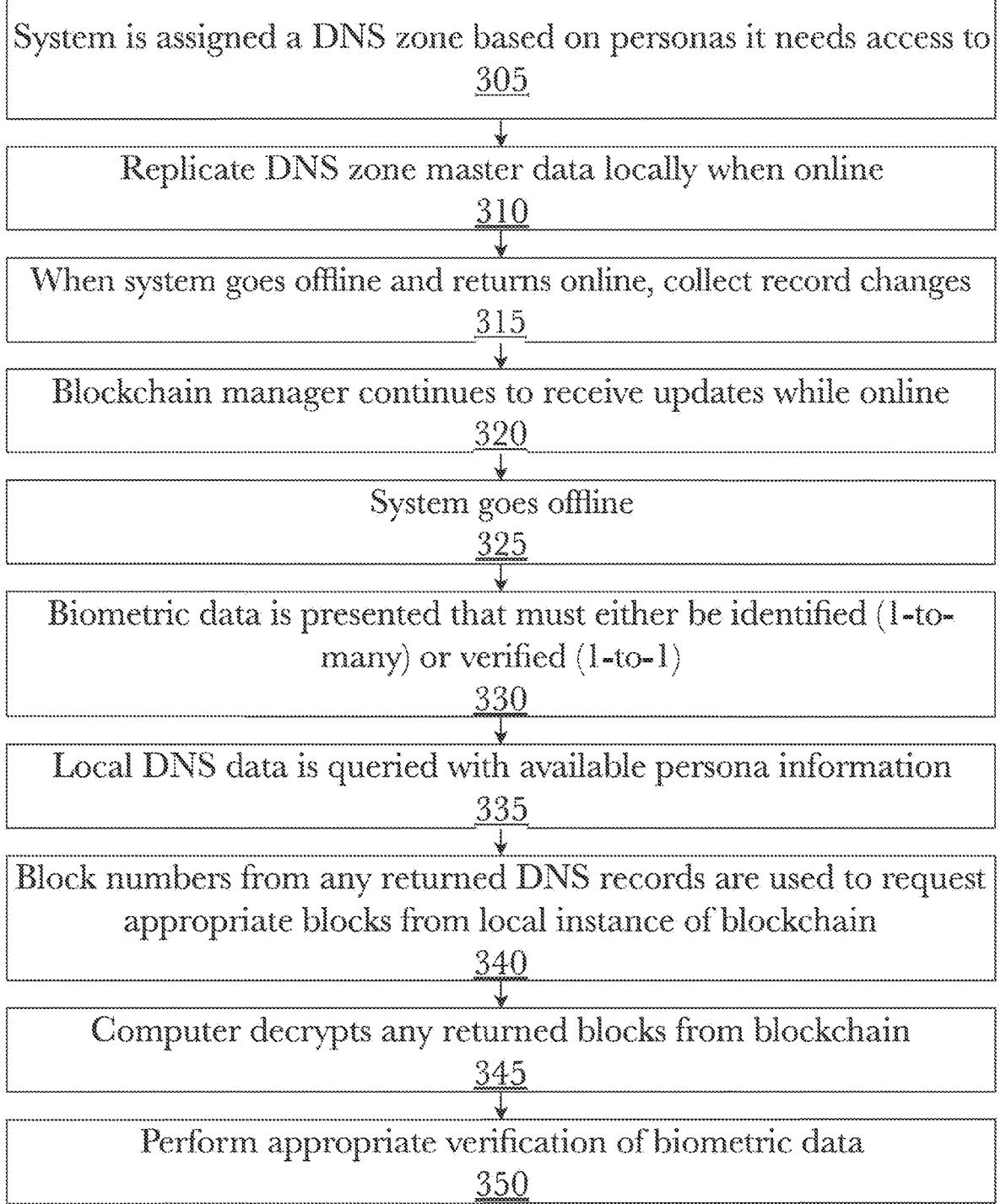

System is assigned a DNS zone based on personas it needs access to
305

Replicate DNS zone master data locally when online
310

When system goes offline and returns online, collect record changes
315

Blockchain manager continues to receive updates while online
320

System goes offline
325

Biometric data is presented that must either be identified (1-to-many) or verified (1-to-1)
330

Local DNS data is queried with available persona information
335

Block numbers from any returned DNS records are used to request appropriate blocks from local instance of blockchain
340

Computer decrypts any returned blocks from blockchain
345

Perform appropriate verification of biometric data
350

Fig. 3

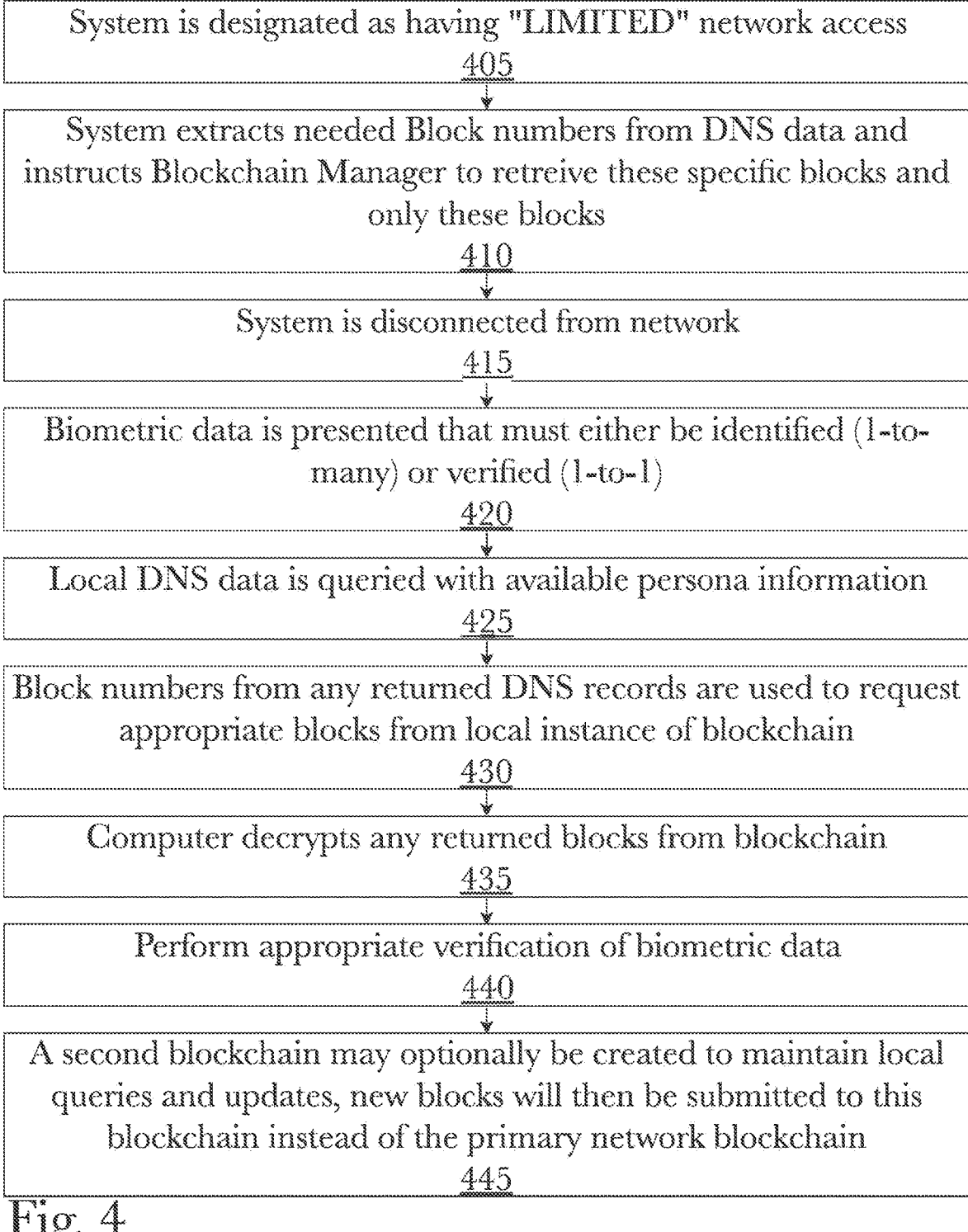

System is designated as having "LIMITED" network access
405

System extracts needed Block numbers from DNS data and instructs Blockchain Manager to retreive these specific blocks and only these blocks
410

System is disconnected from network
415

Biometric data is presented that must either be identified (1-to-many) or verified (1-to-1)
420

Local DNS data is queried with available persona information
425

Block numbers from any returned DNS records are used to request appropriate blocks from local instance of blockchain
430

Computer decrypts any returned blocks from blockchain
435

Perform appropriate verification of biometric data
440

A second blockchain may optionally be created to maintain local queries and updates, new blocks will then be submitted to this blockchain instead of the primary network blockchain
445

Fig. 4

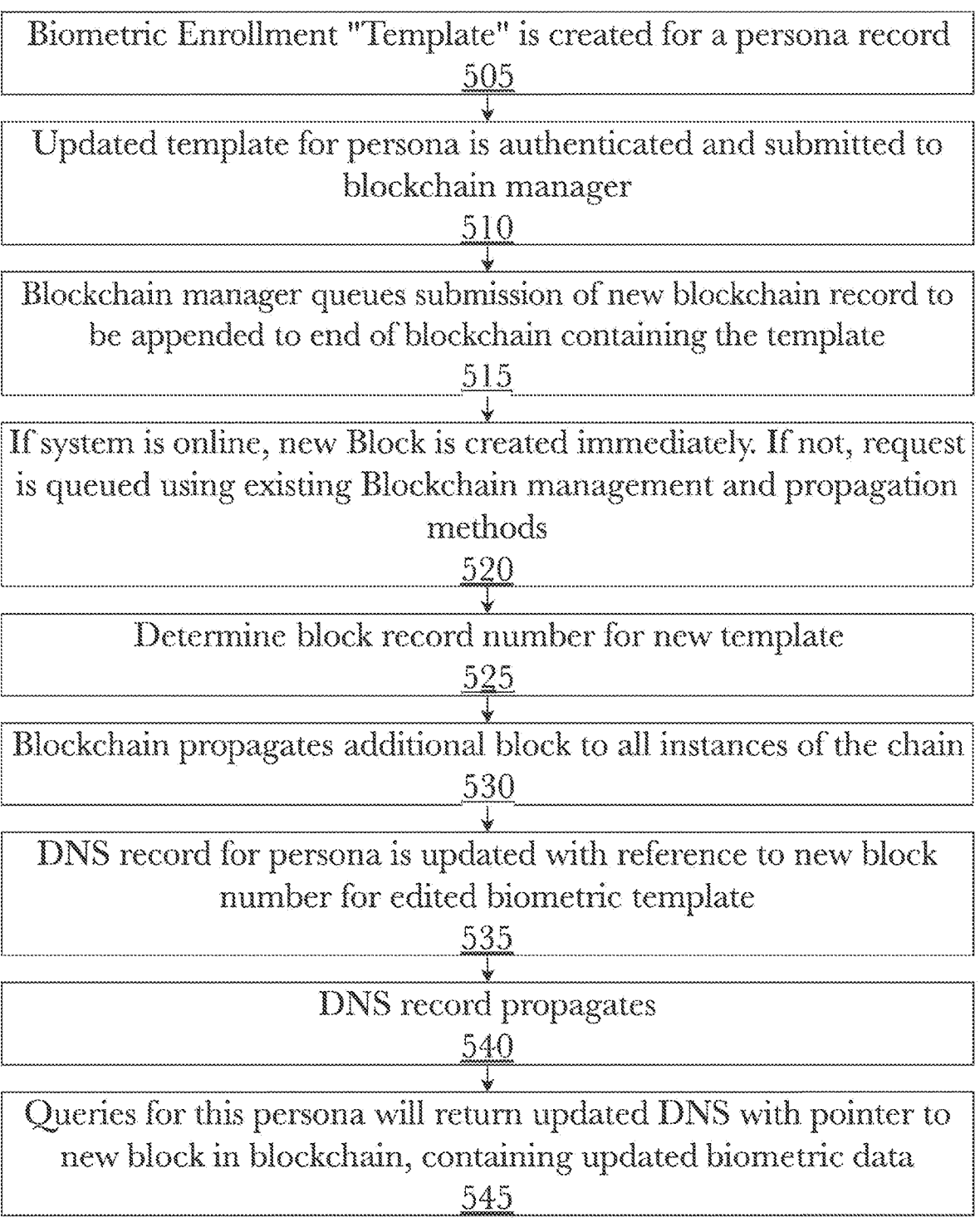

Biometric Enrollment "Template" is created for a persona record
505

Updated template for persona is authenticated and submitted to blockchain manager
510

Blockchain manager queues submission of new blockchain record to be appended to end of blockchain containing the template
515

If system is online, new Block is created immediately. If not, request is queued using existing Blockchain management and propagation methods
520

Determine block record number for new template
525

Blockchain propagates additional block to all instances of the chain
530

DNS record for persona is updated with reference to new block number for edited biometric template
535

DNS record propagates
540

Queries for this persona will return updated DNS with pointer to new block in blockchain, containing updated biometric data
545

Fig. 5

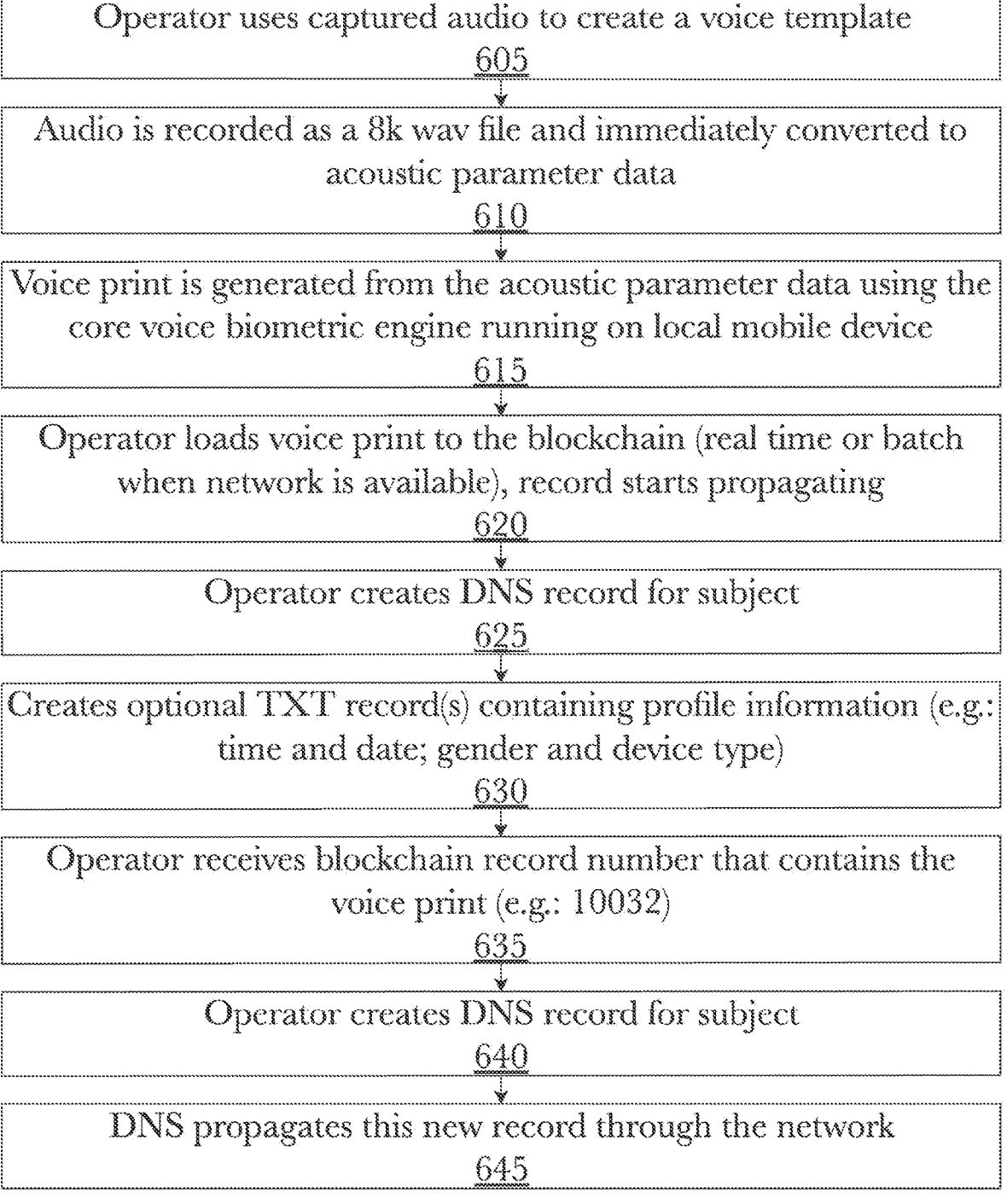

Operator uses captured audio to create a voice template
605

Audio is recorded as a 8k wav file and immediately converted to acoustic parameter data
610

Voice print is generated from the acoustic parameter data using the core voice biometric engine running on local mobile device
615

Operator loads voice print to the blockchain (real time or batch when network is available), record starts propagating
620

Operator creates DNS record for subject
625

Creates optional TXT record(s) containing profile information (e.g.: time and date; gender and device type)
630

Operator receives blockchain record number that contains the voice print (e.g.: 10032)
635

Operator creates DNS record for subject
640

DNS propagates this new record through the network
645

Fig. 6

SYSTEM AND METHOD FOR INFORMATION STORAGE USING BLOCKCHAIN DATABASES COMBINED WITH POINTER DATABASES

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/700,417
Ser. No. 17/335,338
Ser. No. 16/598,006

BACKGROUND OF THE INVENTION

Field of the Art

The disclosure relates to the field of information storage and security, and more specifically to the combination of blockchain databases with pointer databases to increase security and decrease bandwidth and storage requirements.

Discussion of the State of the Art

Blockchain databases have some tremendous advantages, such as immutability of records and decentralized storage and verification of transactions. However, they also have some tremendous disadvantages in terms of database size and lack of searchability. The size of blockchain databases requires substantial bandwidth and storage space to download and store the entire blockchain which prevents or substantially limits their use on mobile devices. Further, while certain records in a blockchain database can be identified, information contained in the records of blockchain databases is not searchable. Therefore, unless one knows the particular record in which information can be found, it's not possible to find information stored in a blockchain database.

What is needed is a system and methods for information storage using blockchain and pointer databases, wherein information such as biometric information is securely and unalterably stored in encrypted form on a distributed blockchain, and wherein the information stored in the distributed blockchain is made searchable and accessible by storing pointers to each block in the blockchain and searchable text descriptors are stored in a text-based domain name system.

SUMMARY OF THE INVENTION

Accordingly, the inventor has conceived and reduced to practice systems and methods for information storage using blockchain databases in connection with pointer databases. The following non-limiting summary of the invention is provided for clarity, and should be construed consistently with embodiments described in the detailed description below. In the system and method, user data is securely and unalterably stored in encrypted form on a distributed blockchain, and pointers to each block in the blockchain and searchable text descriptors are stored in a text-based domain name system, such that the pointers in the domain name system can be searched to identify specific blocks in the blockchain for use, decreasing the bandwidth required for both storage and transmission of this secure data.

According to a preferred embodiment, a system for information storage and retrieval using blockchain and pointer databases is disclosed, comprising: a data verifier comprising a first plurality of programming instructions stored in the memory and operating on the processor of the computing device, wherein the first plurality of programming instructions, when operating on the processor, causes the processor to: receive a text descriptor from a user, wherein the text descriptor comprises identifying information of the user; capture data from the user, the data being of the same type already stored from the user with a verification terminal; query a pointer database manager with the text descriptor; query a blockchain manager for any returned block numbers received from the pointer database manager; decrypt the returned block from the blockchain manager; compare stored data from the returned block with the captured data from the user; and return a confirmation if the compared data matches the stored data.

According to another preferred embodiment, a method for information storage and retrieval using blockchain and pointer databases is disclosed, comprising the steps of: receiving a text descriptor from the user, wherein the text descriptor comprises the identifying information of the user; querying the pointer database with the text descriptor; querying the distributed blockchain for any returned block numbers received from the pointer database; decrypting the returned block from the distributed blockchain; comparing the encrypted identification information from the returned block with the encrypted identification information from the user; and displaying the decrypted block contents to the user.

According to an aspect of an embodiment, a user portal comprising a second plurality of programming instructions stored in a memory of, and operating on a processor of, a computing device, wherein the second plurality of programming instructions, when operating on the processor, causes the processor to: receive data from the user; receive identification information for the user; encrypt the data and identification information; create a block for insertion into a blockchain, the block comprising the encrypted data and identification information, and a block identifier; create a searchable pointer database record for the block comprising the block identifier and searchable text descriptor of the data and at least a portion of the identification information contained in the block; transmit the block to the blockchain manager; and transmit the record to the pointer database manager.

According to an aspect of an embodiment, the pointer database manager comprising a third plurality of programming instructions stored in the memory and operating on the processor of the computing device, wherein the third plurality of programming instructions, when operating on the processor, causes the processor to: receive the searchable pointer database record from the user portal; if the computing device is connected to a network, transmit the record for incorporation into a hierarchical biometric domain name database within a standard domain name system; and if the computing device is not connected to a network, store the record in a queue for later incorporation into the hierarchical biometric domain name database stored within a standard domain name system.

According to an aspect of an embodiment, the pointer database manager is further configured to: create an update message, the update message comprising a set of resource-record updates; send the update message to the standard domain name system; and receive a response message from the standard domain name system.

According to an aspect of an embodiment, the update message further comprises a requested lease and the response message comprises at least a granted lease.

According to an aspect of an embodiment, the response message further comprises an update status, wherein the update status comprises an indication of success or failure to apply the set of resource-record updates.

According to an aspect of an embodiment, the update message comprises updated resource-record information.

According to an aspect of an embodiment, the resource-record information comprises at least a new block number.

According to an aspect of an embodiment, the resource-record information further comprises new data from the user, wherein the new data comprises user biometric data.

According to an aspect of an embodiment, the resource-record information comprises a new text descriptor.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 2 is a method diagram showing the steps taken for biometric data template creation and addition to a blockchain, and DNS reference creation for biometric templates.

FIG. 3 is a method diagram showing the steps for offline storage of biometric blockchain and DNS information.

FIG. 4 is a method diagram showing the steps for acquiring partial blockchain DNS references for a limited access environment.

FIG. 5 is a method diagram showing the steps for updating a biometric information record of a persona in the blockchain, and updating DNS records to point to newest block containing updated biometric template.

FIG. 6 shows an exemplary method for securely storing biometric voice data using blockchain and DNS.

DETAILED DESCRIPTION

Figure 1:
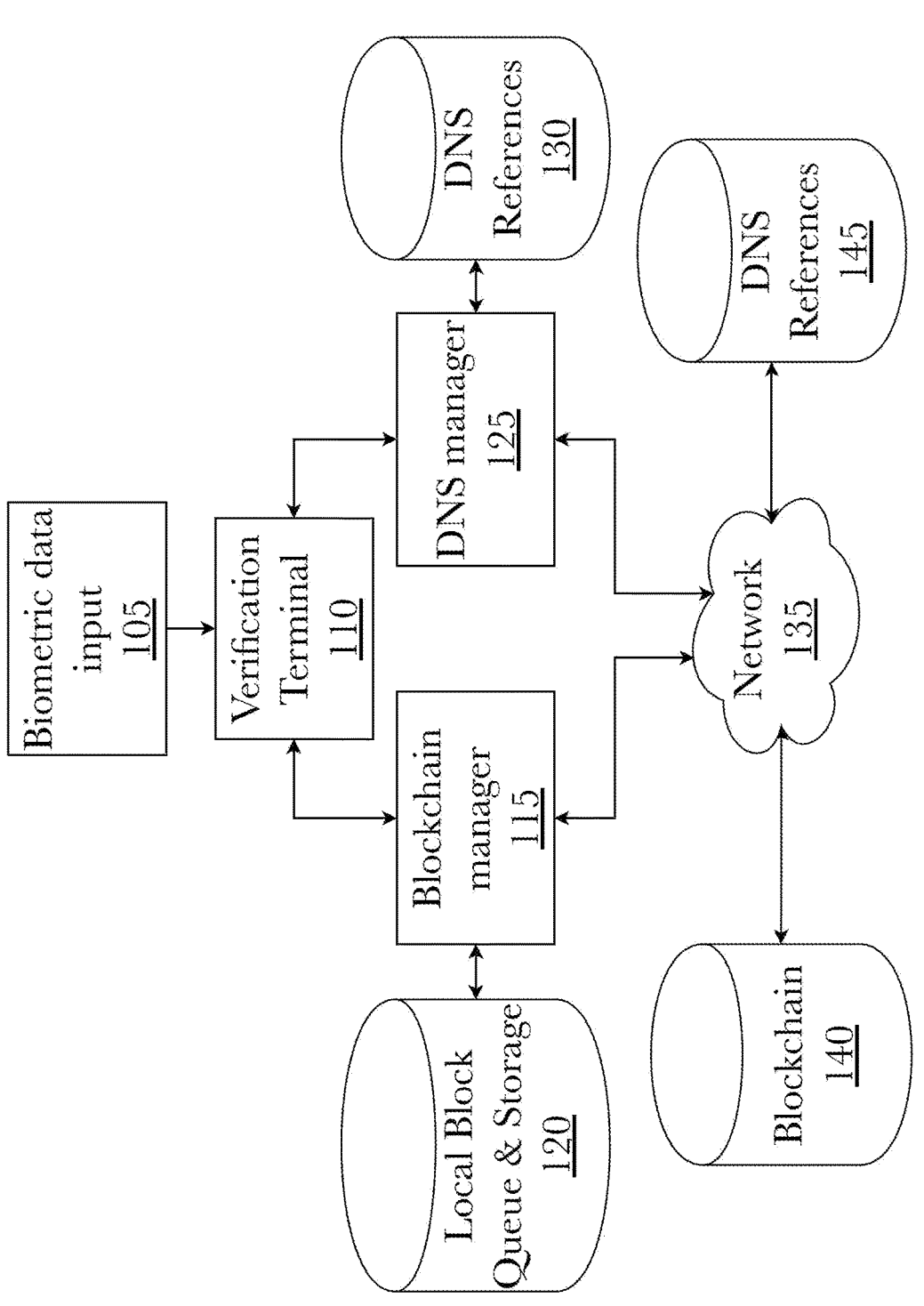
FIG. 1 is a block diagram of a system for information storage using blockchain and pointer databases, including both local and network-connected blockchain and DNS reference stores.

The inventor has conceived, and reduced to practice, system and method for information storage using blockchain databases combined with pointer databases.

As noted previously, the size of blockchain databases presents a problem to their usage on bandwidth limited or computationally-limited computing devices (e.g. mobile phones). Additionally, searching a blockchain, even where possible, can be very slow and computationally intensive. It requires the search to have access to a full version of the blockchain with access to plain text. This makes the searching of encrypted data problematic. Further, if a whole blockchain is loaded, not only is the data large, but if the device is compromised then all biometric data could be compromised which is highly problematic for data security and data protection compliance. So, whilst blockchain technology has many benefits for data security and ensuing compliance of the data, it is problematic where storage and computation may be limited.

The solution to the secure blockchain data storage problem presented herein is to use blockchains in combination with a searchable text datastore, in some embodiments provided herein this is accomplished with domain name system (DNS) technology. DNS is a hierarchical decentralized naming system for computers, services, or other resources connected to the Internet or a private network. DNS has the benefit of being a lightweight, self-distributing, self-updating system and is used extensively to translate canonical names (e.g.: www.yahoo.com) to an IP address. DNS also implements mechanisms to define authority and access. It is very fast and can be implemented locally as a lightweight process on a computer, mobile device or as a dedicated server.

One use case for this invention is the secure storage of the biometric templates or biometric information; especially in situations where communications are constrained and may be intermittent and where store and computational resources are limited, such as in mobile applications and mobile devices.

An identity verification can only be trusted if the biometric template against which a person's identity is being check is also trusted. Further, in many biometric technologies, such as in voice biometric technologies, the template needs to be constantly updated to maintain the accuracy of the template as personal biometric information changes over time.

Further the size of the biometric template (or data blob) can be large. Consequently, it is not always possible to store large amounts of biometric templates on devices with limited storage capabilities. What is more, biometric information is classified as sensitive personal information and storing this data locally on a device can also lead to security being compromised and the solutions not being compliant with emerging data protection regulations such as GDPR in Europe.

While many of the examples contained in the instant application relate to secure storage of biometric information, these examples should not be considered limiting. The invention described herein can be used to securely store and verify any encrypted information contained in any blockchain, along with the use of other text and searchable datastores other than DNS, provided the searchability and propagation needs are met, DNS being a currently-existing system capable of providing these functionalities, hence their usage in some embodiments and examples herein.

In addition, for the purpose of biometric storage and identification or verification, numerous differing methodologies and biometric templates may be used, specific biometric information such as fingerprints or voice prints being used in exemplary methods herein but which are not limiting and only meant to illustrate the use of biometric information storage capable in the system. It is possible for this system to operate effectively with any biometric information, and for that information to be provided by any number of biometric scanning technologies or engines, the invention herein being only a system for secure storage and efficient searching and updating of records such as biometric records.

Further, the DNS standard also allows small amounts of text storage as per the RFC 1035 3.3.14 definition. This is usually used to store domain names used in a DNS system. However, in this invention this is used to point to the blocks in the blockchain thereby mitigating the problem with using blockchain technology for biometric storage, namely managing and processing the large blockchains and the security problems associated with exposing the blockchain information as clear text.

Importantly, blockchain is designed to be replicated across various networks and device types. Background engines on computers, mobile devices or server clouds can be set to constantly fetch records as they are written making Blockchain a useful technology for biometric applications in mobile devices and cloud computing environments.

In some embodiments, the system may use a third party biometric engine (such as a voice biometric engine that converts spoken audio into biometric representations known as "voice prints"). In some embodiments, the system may use a primary DNS domain such as *.biodata, where optional biometric modalities can be specified as subdomains to the primary DNS domain (e.g.: *.voice.biodata for voice biometric data, *.fingerprint.biodata for fingerprint biometric data).

The invention offers many benefits, specifically that an operator working on identification (searching for a voice match of an unknown sample) of another person may do so more swiftly and easily with this system, and a system loaded with biometric templates that are coded solely to a blockchain record can be passed to another operator who may use DNS search tools to find which subject the record matches to. Automated biometrics systems can get lists of records to download, batching them for when data is available, specify themselves to only have a specific zone in the DNS system, and more, for increased on-site security and increased searchability of data.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring nonsimultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Blockchain" as used herein means a digital database operated on a decentralized computing network comprised of individual computers called blocks, which validate transactions, and wherein consensus of validating blocks is required to confirm entries into the database. Blockchains are typically operated on large, decentralized computing networks, which are usually publicly-accessible and unmanaged. In fact, it is often the decentralized, publicly-accessible nature of a blockchain that provides its security, as no record can be changes without a consensus of computers not under the control of a potential attacker. Blockchains are designed to be permanent storage (write once, read many, or WORM) storage systems. Records or updated templates can be added to the blockchain, but existing records cannot be changed, since rewriting is not permitted in a WORM storage system. For purposes of the present application, this creates a forensic trail of biometric templates that can be used to search changes and provide access to various records.

Conceptual Architecture

FIG. 1 is a block diagram of a system for information storage using blockchain and pointer databases, including both local and network-connected blockchain and DNS reference stores. A source of biometric data input 105 such as a fingerprint scanner, voice recognition system, retinal scanner, or other source of biometric data, sends data to a computer verification terminal 110 which may be a workstation, desktop computer, or some computer system specially designed for biometric verification if necessary. The input may be accomplished by a direct connection or a connection over a network. The verification terminal 110 in question maintains a blockchain manager 115 and DNS manager 125 each, which are pieces of software that respectively maintain a local block queue and storage 120 and a local datastore of biometric DNS references 130. The purpose of a blockchain manager 115 is to manage the creation of new blocks to add to a blockchain, the acquisition of blocks from a blockchain by reference number, and the management of a local block queue and storage 120 separate from a network 135 connected or distributed blockchain 140. The purpose and function of a DNS manager 125 is to communicate with a network-connected biometric DNS 145 and to maintain a local repository of DNS references 130, which is necessary for a system to operate when offline or with limited network availability. A network-connected, or distributed, blockchain 140 exists and is able to be queried by a blockchain manager 115 over a network 135, and contains more than any single source's local data. Similarly, DNS references 145 exist in a distributed form similar to DNS systems used by the Internet, but for the purpose of providing zoning based on personas required by individual systems and computers 110 such as those provided for a specific organization or location, and for the purpose of providing searchable information on persona information representing the identity of the person whose biometric information is stored. A reference number to the block in the blockchain 140 is also a part of the DNS system 145, allowing a returned result from a search to provide the reference number to the entry in the blockchain 140 for their biometric template. For instance, a persona may exist with the name "John Doe" and with a description of where he originally registered his biometric template and with what software and techniques, for instance "John Doe, fingerprint scanned using FingerPrintSoftwareXYZ at Central Bank, Los Angeles, reference number 18952," and when an individual at the Central Bank in Los Angeles searches for "John Doe Central Bank" they will get the relevant DNS result returned, enabling them to query the block 18952 from the blockchain 140, 120. This may occur using locally stored data or network-connected resources as shown, depending on the network connectivity and settings of the embodiment.

FIG. 2 is a method diagram showing the steps taken for biometric data template creation and addition to a blockchain, and DNS reference creation for biometric templates. First an initial persona data and biometric template is created 210, persona information containing whatever information an operator of the system determines to be meaningful and non-sensitive information about the person in question. For instance, their name and the name of the organization the operator of the system works for, as well as the type of biometric information that will be recorded, may be used as persona data, while the actual biometric information as formatted by the input system constitutes the biometric template, such as fingerprints or voice pattern recognition data. Initial biometric data is received, and encrypted if necessary 220, after the persona data is filled out, as already mentioned. Next, the filled biometric template is submitted to the blockchain manager 230 so that the blockchain manager may queue submission of the new block to the distributed blockchain 240. For instance, in the case of acoustic data such as a voice record, the operator will load the acoustic data file to the blockchain manager to be created and submitted as a new block on the blockchain, at which time the blockchain manager then receives the block record identifier (typically a sequential number) for added block 250 from the blockchain, which represents the location of the data block in the blockchain, the block containing the encrypted biometric data. When the blockchain manager is online and may access the blockchain, the new block is created and appended immediately using known blockchain techniques to propagate the additional block 260, the blockchain propagation techniques themselves not being the core subject of the disclosed invention and being well-known in the art. After the new block is attached to the chain and the reference number for the block is known, the computer authenticates the new block record number with the DNS manager 270, verifying that the reference number is not already in-use. When this is accomplished, a new DNS entry is created in which the "domain name" contains persona information to make it searchable, including block number on the blockchain and any other relevant non-sensitive data 280, such as the person's legal name or the organization or individual performing the biometric template creation, for ease of searching, for instance "Encoder=8 KHZ acoustic data; Location=10099." This record is propagated using known techniques 290 for DNS propagation. After a block is propagated, and the DNS record is propagated, both with the pertinent and correct information, a user may be identified through this system by entering claimed identification credentials similar to those stored unencrypted in the DNS file such as "Encoder=8 KHZ acoustic data; Location=10099," have their identification matched against a DNS record, at which time the DNS record may be pulled and the information about the matching block in the blockchain is also made available. The block may then be requested from the blockchain and the data decrypted using the method it was originally used to encrypt it depending on the vendor or operator of the system, and the data may be verified using existing biometric techniques at this point. The following is an example of loading updated voice prints. A machine learning algorithm is applied to generate an updated voiceprint using new audio sample. An operator loads the updated voice print into the blockchain (real time or batch when network is available). The blockchain starts propagating this new record across the network. The operator receives a blockchain record number that contains the voice template (e.g.: 23321), and modifies the DNS text record for the previous encoded template, changing template location and date of generation on the blockchain (e.g.: "BioEngine17-2'; Location=23321; Date=230224Z22072018"), which DNS then propagates through the network.

FIG. 3 is a method diagram showing the steps for offline storage of biometric blockchain and DNS information. The system is first assigned a DNS zone based on personas it needs access to 305, in much the same way that a DNS zone is a portion of the domain name space in the Internet DNS, where administrative responsibilities for a zone are delegated to a single manager. The computer operating the DNS manager then replicates DNS zone master data locally when online 310, meaning that while still initially online, the zone master data is copied to the local DNS reference datastore, as necessary for the appropriate DNS zone the computer is in. If at any time the system goes offline and returns online, it collects record changes 315. The local block queue and storage manager continues to receive updates while online 320, until the system goes offline 325. While the system is still offline, biometric data may be presented that must either be identified (1-to-many) or verified (1-to-1) 330. Local DNS data is then queried with available persona information 335, for instance searching the local DNS reference datastore or cache for entries with the same legal name as the person needing verification, or matching certain markers of the biometric data with what is recorded in the DNS reference when identifying an individual. Block numbers from any returned DNS records are used to request appropriate blocks from the local block queue and storage with the blockchain manager 340, before the computer decrypts any returned blocks from blockchain 345. An operator may manually, or the computer may automatically, then perform appropriate verification of biometric data 350, whether verifying a person or identifying them. The following example of verification assumes that the speaker has the identity named "subject2994." In this example, a subject may enter claimed identification credential (ID number, phone number). An operator may check the identification credentials in local database, matching the subject's identity credentials matched against a particular stored identity profile (e.g., "subject2994"). The voice biometric app checks DNS for voice.subject2994.biodata. DNS responds with the following TXT records:
"Encoder='BioEngine17';Location=23321;
Date=230224Z22072018," and
"Encoder=WAV8KHZ;Location=10099," which indicate that the encoding engine used, the location of the records, a date stamp, and the audio quality. Voice verification is performed using the encrypted blockchain record associated with that DNS record.

FIG. 4 is a method diagram showing the steps for acquiring partial blockchain DNS references for a limited access environment. An implementation of the system comprising the local computer and blockchain manager, DNS manager, and their respective datastores may be designated as having "limited" network accessibility, whether this is for security purposes, due to bandwidth issues, or some other concern 405. Based on the DNS zone and possibly the specifically specified DNS references and blockchain blocks, the system only queries and copies locally the necessary blocks and DNS references, and no others 410, before the system, might go offline 415. While the system is still offline, biometric data may be presented that must either be identified (1-to-many) or verified (1-to-1) 420. Local DNS data is then queried with available persona information 425, for instance searching the local DNS reference datastore or cache for entries with the same legal name as the person needing verification, or matching certain markers of the biometric data with what is recorded in the DNS reference when identifying an individual. Block numbers from any returned DNS records are used to request appropriate blocks from the local block queue and storage with the blockchain manager 430, before the computer decrypts any returned blocks from blockchain 435. An operator may manually, or the computer may automatically, then perform appropriate verification of biometric data 440, whether verifying a person or identifying them. A second blockchain may optionally be created to maintain local queries and updates, new blocks will then be submitted to this blockchain instead of the primary network blockchain as necessary 445.

FIG. 5 is a method diagram showing the steps for updating a biometric information record of a persona in the blockchain, and updating DNS records to point to newest block containing updated biometric template. A biometric template is created for a persona record 505, as discussed in other drawings, whereby a block in the blockchain exists which contains biometric information on an individual and a DNS record exists which contains persona information such as name or other methods of identifying the person and a reference to the block in the blockchain which contains their biometric data. Machine learning may be applied to generate an updated biometric file using new samples, for instance a new audio sample of a user speaking. When an updated template for a persona is authenticated and submitted to blockchain manager 510, such as voice biometrics being updated for someone after an event which alters their voice or if biometric data becomes invalid for some reason where the operator loads an updated voice print into the blockchain, before the blockchain manager queues submission of the new blockchain record to be appended to end of blockchain containing the template 515. If the system is online, a new block is created immediately to be queued for appending to the end of the blockchain network and local instance. If not, the request is queued using existing blockchain management and propagation methods 520. Following the creation of the new block, the computer will determine the permanent block record number for new template 525 based on the state of the blockchain network when it is next connected to the network, before the blockchain propagates additional block to all instances of the chain 530. In this way, there is not yet any indication that there has been an update to a persona, however a modified TXT record for the DNS record associated with the persona is updated with reference to the new block number and date of generation on the blockchain for the edited biometric template 535, before the DNS record propagates 540. Thereafter, queries for this persona will return the updated DNS with pointer to new block in blockchain, containing updated biometric data 545. In this way, continuity with updated information is maintained, while the blockchain continues to maintain the ledger of all previous biometric data.

FIG. 6 shows an exemplary method for securely storing biometric voice data using blockchain and DNS. First, an operator uses captured audio to create a voice template 605, as shown in previous embodiments where biometric data is captured from a user, before audio is recorded as an 8 k wav file and immediately converted to acoustic parameter data 610. For other embodiments as needed in the industry, other audio recording specifications may be used as necessary. A voice print is generated from the acoustic parameter data using the core voice biometric engine running on a local mobile device 615, which may be one of many possible voice biometric engines available to the operator. The operator then loads the voice print to the blockchain in real time or in a batch when the network is available, allowing the record to start propagating 620 using known blockchain methods, before the operator then creates a DNS record for the subject 625 according to earlier embodiments whereby a DNS record with a TXT record may be created containing non-sensitive identifying information of the subject and biometric capture event 630. In this way, when the DNS record is finalized and propagated, the DNS record specifying the relevant block number on the blockchain may be searched and found using certain identifying information as needed. The operator receives the blockchain record number that contains the voice print (e.g.: 10032) 635 allowing the operator to create the DNS record for the subject 640, before the DNS record propagates this new record through the network 645.

Figure 7:
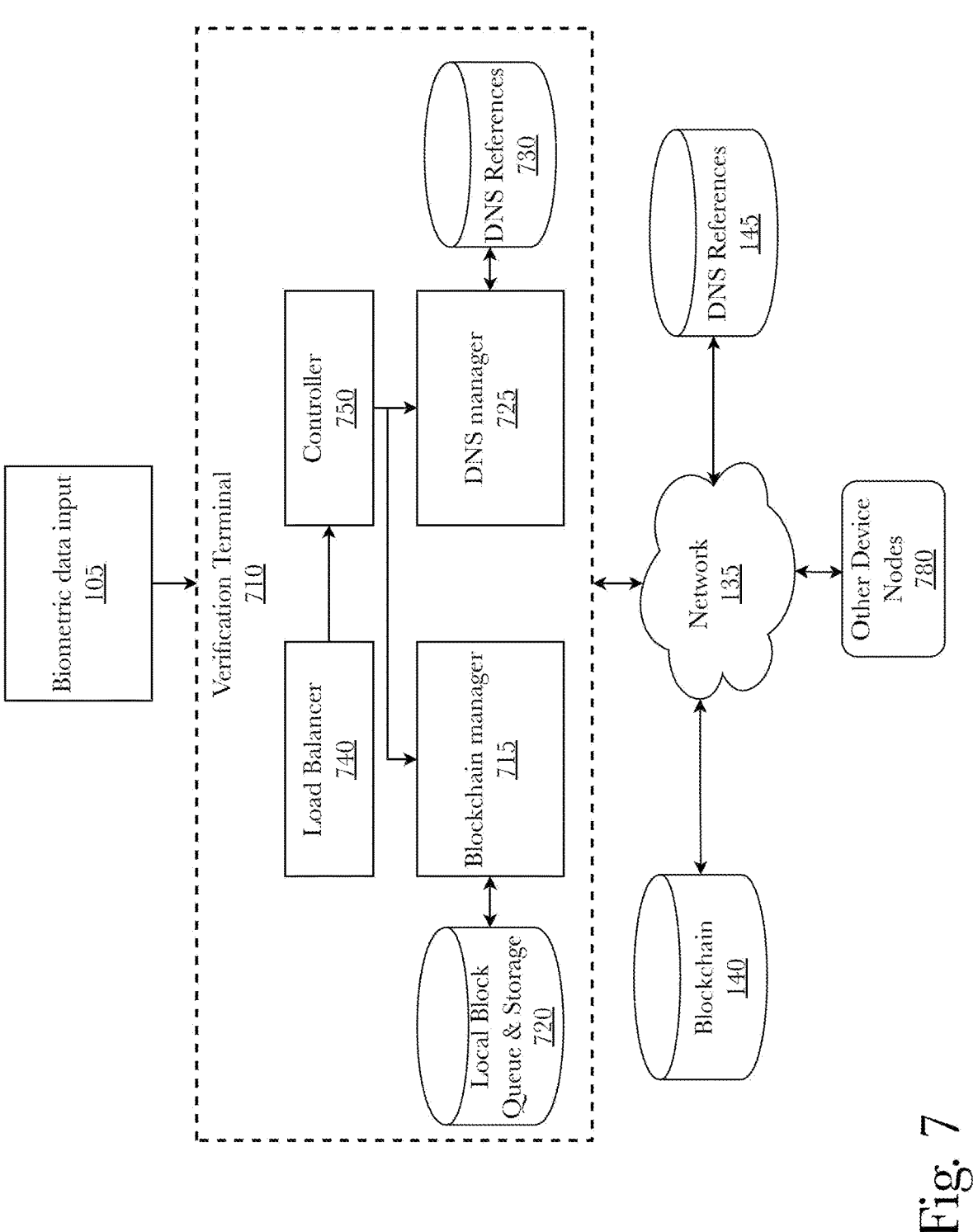
FIG. 7 is a block diagram illustrating an exemplary embodiment for a system for information storage using blockchain and pointer databases, including mechanisms for validating system requests and for updating resource records within a DNS system.

FIG. 7 is a block diagram illustrating an exemplary embodiment for a system for information storage using blockchain and pointer databases, including mechanisms for validating system requests and for updating resource records within a DNS system. A source of biometric data input 105 such as a fingerprint scanner, voice recognition system, retinal scanner, or other source of biometric data, sends data to a computer verification terminal 710 which may be a workstation, desktop computer, or some computer system specially designed for biometric verification if necessary. Verification terminal 710 may be referred to herein as "verification node" and may be used synonymously. The input may be accomplished by a direct connection or a connection over network 135. The verification terminal 710 in question maintains a blockchain manager 715 and DNS manager 725, which are pieces of software that respectively maintain a local block queue and storage 720 and a local datastore of biometric DNS references 730. The purpose of a blockchain manager 715 is to manage the creation of new blocks to add to a blockchain, the acquisition of blocks from a blockchain by reference number, and the management of a local block queue and storage 720 separate from network 135 connected or distributed blockchain 140. A purpose and function of a DNS manager 725 is to communicate with a network-connected biometric DNS server 145 and/or other device nodes 780 and to maintain a local repository of DNS references 730, which is necessary for a system to operate when offline or with limited network availability. A network-connected, or distributed, blockchain 140 exists and is able to be queried by a blockchain manager 115 over a network 135, and contains more than any single source's local data. Similarly, DNS references 145 exist in a distributed form similar to DNS systems used by the Internet, but for the purpose of providing zoning based on personas required by individual systems and computers 710 such as those provided for a specific organization or location, and for the purpose of providing searchable information on persona information representing the identity of the person whose biometric information is stored. A reference number to the block in the blockchain 140 is also a part of the DNS server 145, allowing a returned result from a search to provide the reference number to the entry in the blockchain 140 for their biometric template. For instance, a persona may exist with the name "John Doe" and with a description of where he originally registered his biometric template and with what software and techniques, for instance "John Doe, fingerprint scanned using FingerPrintSoftwareXYZ at Central Bank, Los Angeles, reference number 18952," and when an individual at the Central Bank in Los Angeles searches for "John Doe Central Bank" they will get the relevant DNS result returned, enabling them to query the block 18952 from the blockchain 140, 720. This may occur using locally stored data or network-connected resources as shown, depending on the network connectivity and settings of the embodiment.

According to the embodiment, the system provides DNS resource-record update capabilities responsive to biometric data updates. In some implementations, DNS manager 725 is configured to facilitate resource-record updates with DNS server 145 and/or other device nodes 780. In an embodiment, verification terminal 710 (and/or one of its components such as DNS manager 725) can create an update request message, wherein the update request message comprises a set of resource-record updates. In some implementations, the update request message may also comprise a requested lease. DNS manager 725 can send the update request message to a DNS server 145 and/or another device node 780. At the DNS server 145 the update request message may be received and DNS server 145 can grant a lease, responsive to any received lease request, and start a lease timer. The granted lease may be less than, equal to, or greater than the requested lease. The lease timer may be reset when a new update request message is received, wherein the update request message is the same as a previously received update request message. If the lease expires, then DNS server 145 can delete the updated resource records, thereby preventing DNS server 145 from storing stale resource records that correspond to a disconnected (no network connection) network device 780 and/or verification terminal 710.

Furthermore, DNS manager 725 can receive a response message back from DNS server 145 and/or another device node 780, wherein the response message comprises the granted lease. DNS manager 725 is configured to start a lease timer and to monitor for when the lease timer is about to expire. If the lease timer is about to expire then DNS manager 725 can send an update refresh message. In some implementations, the update refresh message may be the same as the previously sent update request message. If the response message from DNS server 145 was not received within a pre-determined specified time period, then DNS manager 725 can resend an update refresh message. If instead, the response message was received within the pre-determined time period, then DNS manager 725 can start a lease timer and continue monitoring it.

In various implementations, both of the update request message and the response message may utilize the same DNS update packet structure.

Also present in this embodiment is a load balancer 740 and controller 750 which can improve system efficiency as the system scales to handle a larger volume of system requests such as, for example (and non-limiting), blockchain block retrieval requests, DNS reference search queries, and resource-record updates. Verification terminal 710 can receive one or more of these various requests and/or transactions at the load balancer 740. According to the embodiment, verification terminal 710 includes controller 750, which can include multiple controller units. The load balancer 740 can forward tasks to controller 750 to avoid overwhelming the control units and improve efficiency with which system requests and/or transactions are processed.

Controller can manage multiple request types. Controller can manage queries for information. Controller can direct requests to the appropriate verification terminal 710 component utilized to service that request. For example, controller 750 can direct block retrieval requests to blockchain manager 715 and direct search queries and resource-record update requests to DNS manager 725. Accordingly, controller 750 can prevent a query for information from interfering with components used to service a block transaction request and vice versa.

Upon receiving a request, controller 750 can perform a series of initial checks. For example, in some implementations, controller 750 performs basic spam checks to limit the amount of data received from a given IP address. In doing so, controller 750 can provide DDoS protection by performing blacklisting and filtering out invalid or high-volume input, preventing such input from wasting the resources of the components of verification terminal 710. Additionally, controller can perform a series of additional checks in order to determine whether a request or transaction is properly formed. For example, controller 750 can check the input signature(s) on a block request to determine whether the transaction request is properly signed and to check the authentication key of the user account (e.g., address of the user account (persona template) or the hash of the public key associated with the user account) sending the transaction request to confirm that the authentication key corresponds to the public key whose private key was used to sign the transaction.

Figure 8:
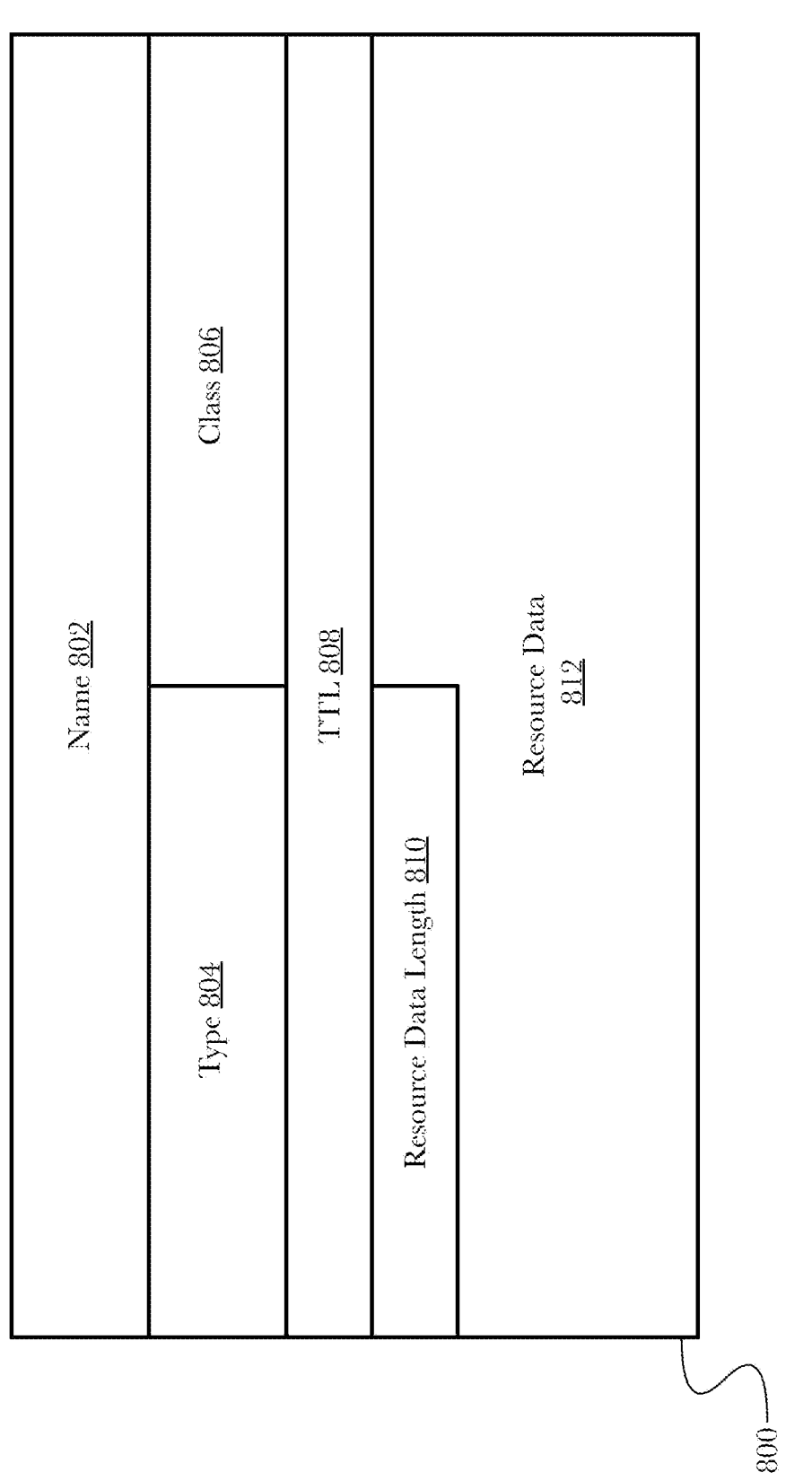
FIG. 8 is an exemplary structure of a resource record that can be used by verification terminal (i.e., a network node) to exchange information with a DNS server, according to an aspect of an embodiment.

FIG. 8 is an exemplary structure of a resource record 800 that can be used by verification terminal 710 (i.e., a network node) to exchange information with a DNS server 145, according to an aspect of an embodiment. Specifically, resource record 800 contains a domain name field 802, which specifies the domain name under consideration. Resource record 800 also contains a resource record type filed 804 and a resource record class field 806, which specifies the type and class of the resource record, respectively. Additionally, resource record includes a time-to-live ("TTL") field 808, which specifies the amount of time (in seconds) that the resource record can be cached by a network node.

Furthermore, resource record 800 contains a resource record data field 812, which is a variable length field that can be used by a network node to exchange information with a DNS server 145. Resource record 800 also contains a resource data length field 810, which specifies the amount of data in the variable length resource data field 812.

In operation, when user biometric data is updated on the blockchain a new block number (e.g., reference number) is assigned and this new block number needs to be updated in the DNS server database 145 and then propagated to all other (e.g., local and external) DNS references such as, for example, 130, 145, and 780 such that any network node (e.g., computer, laptop, smart phone, smart wearable, etc.) can look up accurate and up-to-date information in the DNS server database. DNS manager 725 can be configured to create a resource record update-request message containing a set of resource record updates. In some implementations, the update-request message further contains a requested lease. The update-request message includes a DNS update packet. Furthermore, the resource record updates are specified in an update resource records field in the DNS update packet. Moreover, the requested lease is specified in a lease field, which may be contained in the resource data field 812 contained in the additional data resource records field in the DNS update packet. DNS manager 725 then sends the update-request message to a DNS server 145. This process may be conducted using User Datagram Protocol or Transmission Control Protocol to exchange update-request messages and response messages with DNS server 145.

In one exemplary embodiment of resource record 800, the domain name 802 can include a block reference number and persona information such as a name, organization, username, etc. The domain type 804 may indicate the type of biometric data stored (e.g., voiceprint, fingerprint, retinal scan, etc.) and the domain class 806 may indicate that is of the data class biometric. The resource data 812 can indicate the requested lease time. In some embodiments, both of the resource-request message and response messages may utilize the above described DNS update packet to update the illustrated resource record 800 in a DNS server database.

Figure 9:
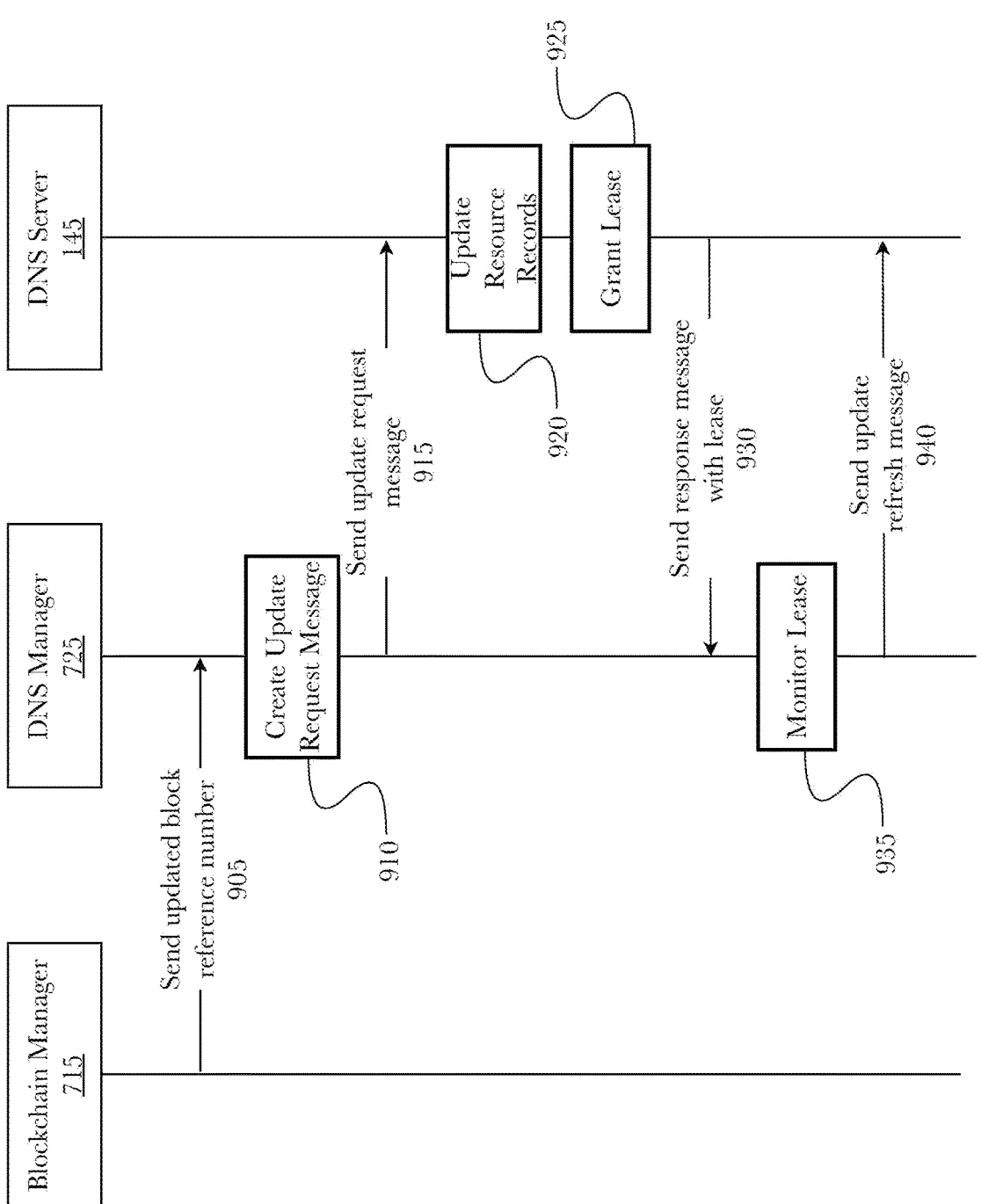
FIG. 9 is an exemplary message flow diagram illustrating how various components of a system for information storage using blockchain and pointer databases pass data as it processes a resource-record update request, according to an embodiment.

FIG. 9 is an exemplary message flow diagram illustrating how various components of a system for information storage using blockchain and pointer databases pass data as it processes a resource-record update request, according to an embodiment. According to the embodiment, verification terminal 710 can receive biometric input data 105 from various biometric data capturing systems. In some use cases, new or updated biometric input data may be received which is to replace existing biometric data stored in a block on a blockchain 120, 140. In this scenario, a blockchain manager 715 can receive the updated biometric data and store it in a block which can be appended to the blockchain in real-time or in a batch upload, dependent upon the embodiment and configuration of the system. When a new block is created to store the updated biometric data, blockchain manager 715 can capture the new block reference number and send this information 905 to DNS manager 725. At DNS manager 725, responsive to receiving updated block reference data, an update request message is created at 910, wherein the update request message comprises a set of resource-record updates and a requested lease. The resource-record updates may comprise a plurality of information that can be used to apply the update. For example, the information may comprise the new block reference number and/or new biometric data such as voiceprint data or fingerprint data. Once the update request message has been created, DNS manager 725 sends the update request message 915 to DNS server 145 and/or another device node 780, which updates the resource records 920 according to the information contained therein and grants a lease 925 associated with the resource-record update.

In this exemplary illustration, the resource records are updated with the new block reference number which allows a system operator to search DNS database for the user, retrieve the updated block reference number, and use blockchain manager 715 to quickly retrieve the block which corresponds to the updated block reference number, and use the biometric data stored therein to provide user authentication and identification. At this point DNS server 145 can also start a lease timer, which when it runs out, causes the DNS server 145 to delete the updated resource-record data. DNS server 145 can then send a response message 930 with the granted lease to DNS manager 725. DNS manager 725 may instantiate a lease timer and monitor 935 the timer to determine if an update refresh message needs to be sent 940 to DNS server 145. In some implementations, the update refresh message may be sent based on the contents of a received response message, wherein the contents of the response message may indicate a success or failure to incorporate the updated resource-record information into the DNS server 145.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
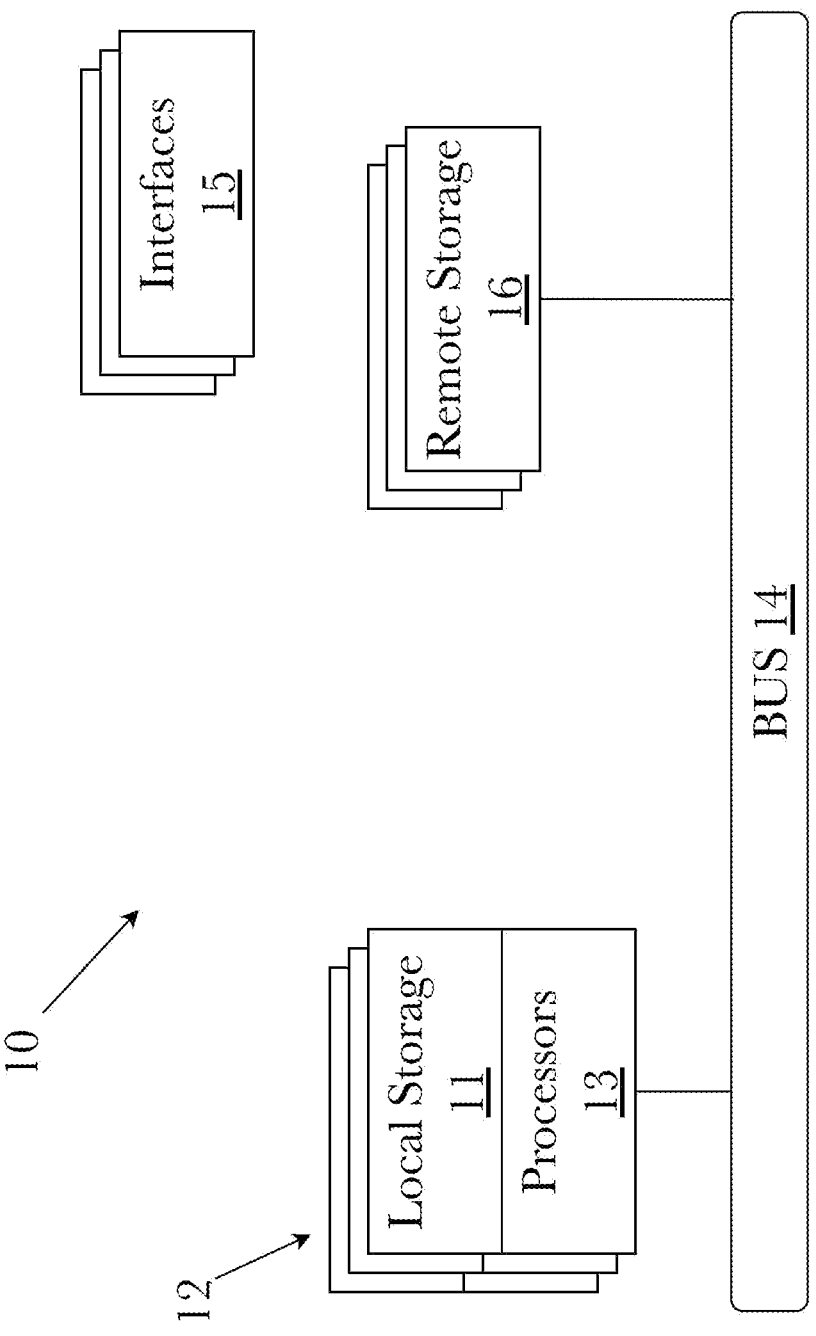
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine- readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
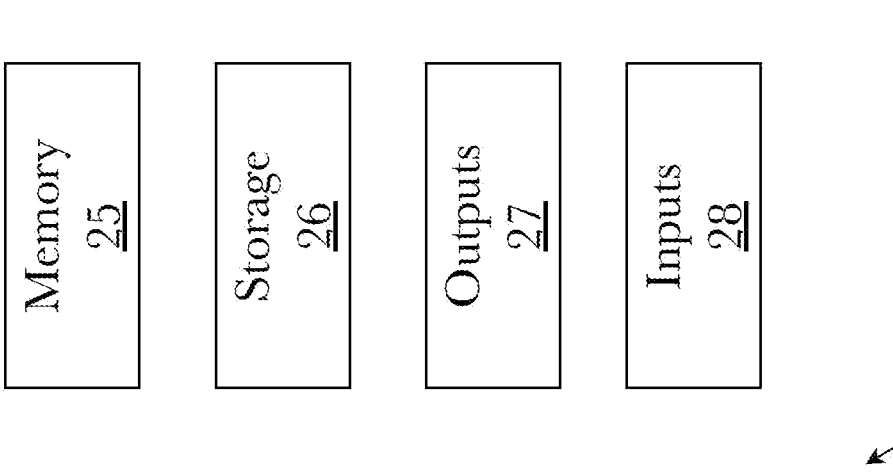
FIG. 11 is a block diagram illustrating an exemplary logical architecture for a client device.

In some embodiments, systems according to the present invention may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
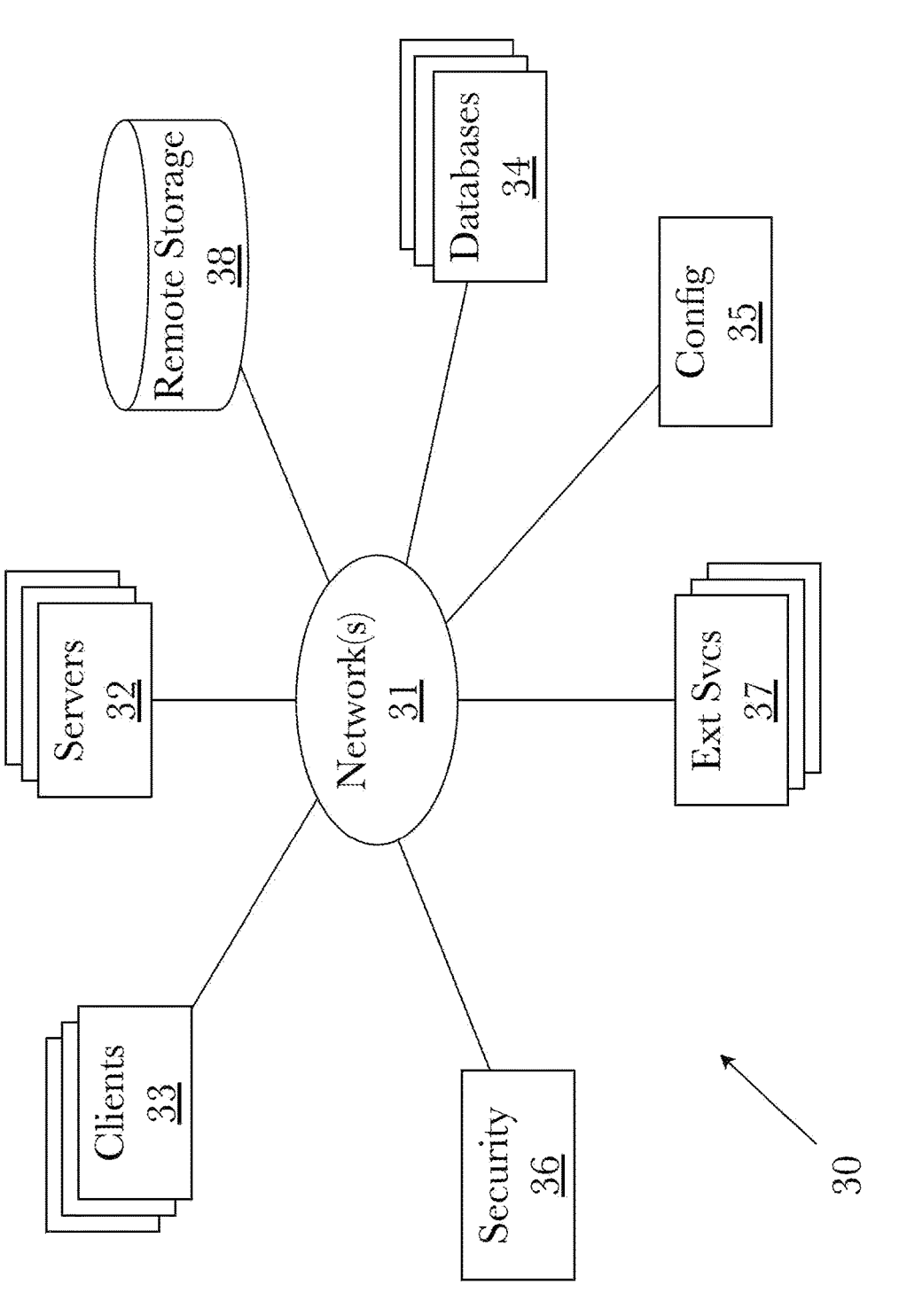
FIG. 12 is a block diagram showing an exemplary architectural arrangement of clients, servers, and external services.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
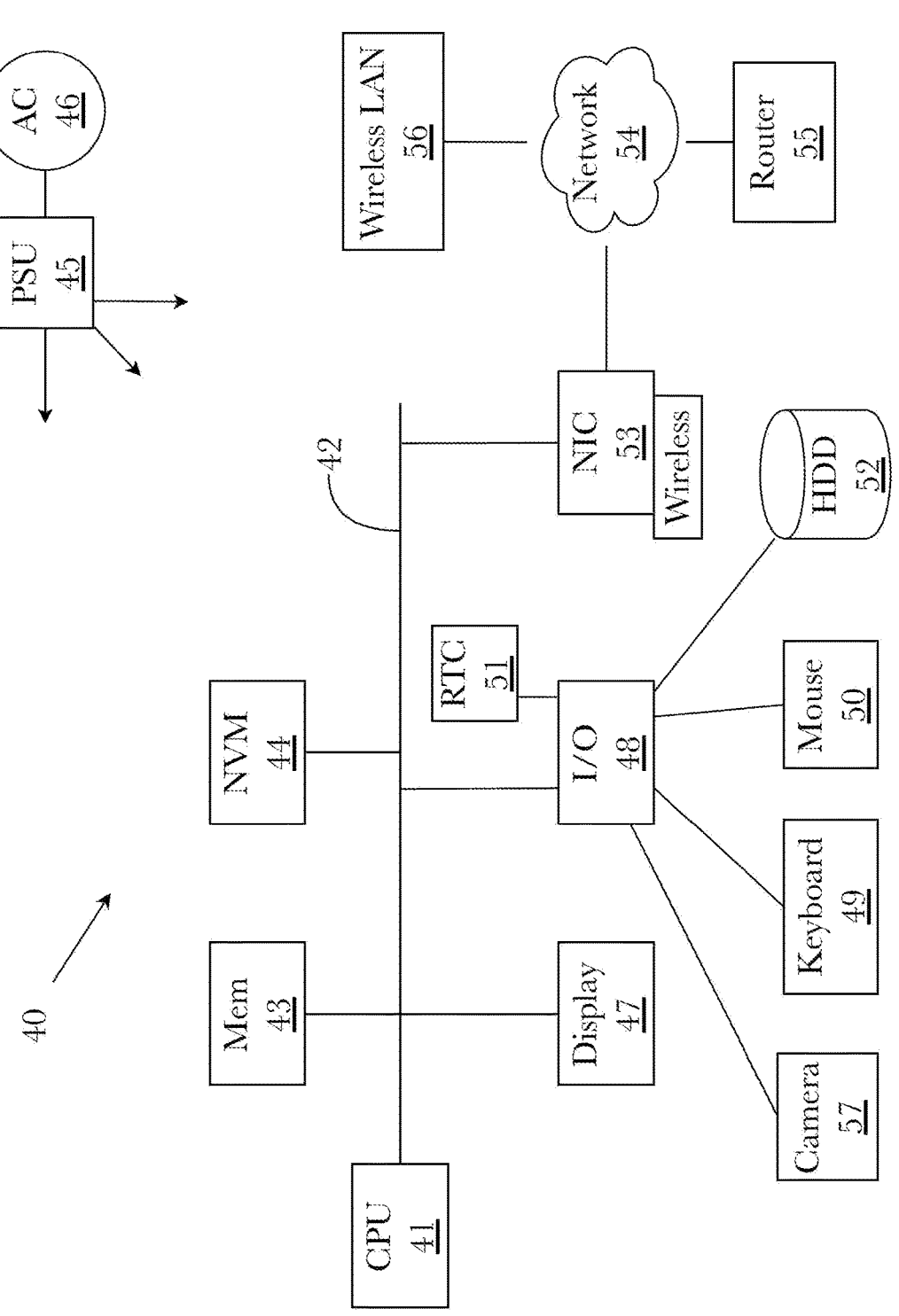
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for information storage and retrieval using blockchain and pointer databases, comprising:

a data verifier comprising a first plurality of programming instructions stored in a memory and operating on a processor of a computing device, wherein the first plurality of programming instructions, when operating on the processor, causes the processor to:

receive a text descriptor from a user, wherein the text descriptor comprises identifying information of the user;

capture first data from the user, the first data being of a same type already stored from the user with a verification terminal;

query a pointer database manager with the text descriptor;

query a blockchain manager for any returned block numbers received from the pointer database manager;

decrypt a returned block from the blockchain manager;

compare stored data from the returned block with the captured data from the user; and return a confirmation if the captured data matches the stored data;

a user portal comprising a second plurality of programming instructions stored in the memory of, and operating on the processor of, the computing device, wherein the second plurality of programming instructions, when operating on the processor, causes the processor to:

receive second data from the user;

receive identification information for the user;

encrypt the second data and identification information;

create a block for insertion into a blockchain, the block comprising the encrypted second data, the identification information, and a block identifier;

create a searchable pointer database record for the block comprising the block identifier and searchable text descriptor of the second data and at least a portion of the identification information contained in the block;

transmit the block to the blockchain manager; and transmit the searchable pointer database record to the pointer database manager; and the pointer database manager comprising a third plurality of programming instructions stored in the memory and operating on the processor of the computing device, wherein the third plurality of programming instructions, when operating on the processor, causes the processor to:

receive the searchable pointer database record from the user portal;

if the computing device is connected to a network, transmit the searchable pointer database record for incorporation into a hierarchical biometric domain name database within a standard domain name system; and if the computing device is not connected to a network, store the searchable pointer database record in a queue for later incorporation into the hierarchical biometric domain name database stored within a standard domain name system.

2. The system of claim 1, wherein the pointer database manager is further configured to:

create an update message, the update message comprising a set of resource-record updates;

send the update message to the standard domain name system; and receive a response message from the standard domain name system.

3. The system of claim 2, wherein the update message further comprises a requested lease and the response message comprises at least a granted lease.

4. The system of claim 3, wherein the response message further comprises an update status, wherein the update status comprises an indication of success or failure to apply the set of resource-record updates.

5. The system of claim 2, wherein the update message comprises updated resource-record information.

6. The system of claim 5, wherein the updated resource-record information comprises at least a new block number.

7. The system of claim 6, wherein the updated resource-record information further comprises new data from the user, wherein the new data comprises user biometric data.

8. The system of claim 5, wherein the resource-record information comprises a new text descriptor.

9. A method implemented on a computing system for information storage and retrieval using blockchain and pointer databases, comprising the steps of:

receiving a text descriptor from the user, wherein the text descriptor comprises identifying information of the user;

querying a pointer database with the text descriptor;

querying a distributed blockchain for any returned block numbers received from the pointer database;

decrypting a returned block from the distributed blockchain to produce decrypted block contents;

comparing encrypted identification information from the returned block with encrypted identification information from the user;

displaying the decrypted block contents to the user;

receiving identification information for the user;

encrypting the identification information;

creating a block for insertion into a blockchain, the block comprising the encrypted identification information and a block identifier;

creating a searchable pointer database record for the block comprising the block identifier and a searchable text descriptor of the decrypted block contents and at least a portion of the encrypted identification information contained in the block;

transmitting the block to a blockchain manager;

transmitting the searchable pointer database record to a pointer database manager;

if the computing system is connected to a network, transmitting the searchable pointer database record for incorporation into a hierarchical biometric domain name database within a standard domain name system; and if the computing system is not connected to a network, storing the searchable pointer database record in a queue for later incorporation into the hierarchical biometric domain name database stored within a standard domain name system.

10. The method of claim 9, further comprising the steps of:

creating an update message, the update message comprising a set of resource-record updates;

sending the update message to the standard domain name system; and receiving a response message from the standard domain name system.

11. The method of claim 10, wherein the update message further comprises a requested lease and the response message comprises at least a granted lease.

12. The method of claim 11, wherein the response message further comprises an update status, wherein the update status comprises an indication of success or failure to apply the set of resource-record updates.

13. The method of claim 10, wherein the update message comprises updated resource-record information.

14. The method of claim 13, wherein the updated resource-record information comprises at least a new block number.

15. The method of claim 14, wherein the updated resource-record information further comprises new data from the user, wherein the new data comprises user biometric data.

16. The method of claim 13, wherein the updated resource-record information comprises a new text descriptor.

\* \* \* \* \*